(12) United States Patent
Miao (10) Patent No.: US 10,715,048 B2
(45) Date of Patent: Jul. 14, 2020

(54) CONTROLLER AND CONTROL METHOD USED IN RESONANT CONVERTERS

(71) Applicant: Hangzhou MPS Semiconductor Technology, Ltd., Hangzhou (CN)

(72) Inventor: Lei Miao, Hangzhou (CN)

(73) Assignee: Hangzhou MPS Semiconductor Technology Ltd., Hangzhou (CN)

( * ) Notice: Subject to any disclaimer, the term of this patent is extended or adjusted under 35 U.S.C. 154(b) by 0 days.

(21) Appl. No.: 16/453,912

(22) Filed: Jun. 26, 2019

(65) Prior Publication Data

US 2020/0007043 A1  Jan. 2, 2020

(30) Foreign Application Priority Data

Jul. 2, 2018  (CN) .......................... 2018 1 0710915

(51) Int. Cl.
  *H02M 3/335*  (2006.01)
  *H02M 1/088*  (2006.01)
  *H02M 1/00*   (2006.01)

(52) U.S. Cl.
  CPC ....... *H02M 3/33569* (2013.01); *H02M 1/088* (2013.01); *H02M 2001/0009* (2013.01)

(58) Field of Classification Search
  CPC ............. H02M 3/33569; H02M 1/088; H02M 2001/0009; H02M 2007/4815; H02M 3/33507; H02M 3/33523; Y02B 70/1433; Y02B 70/1441

See application file for complete search history.

(56) References Cited

U.S. PATENT DOCUMENTS

| | | | | |
|---|---|---|---|---|
| 5,424,933 A * | 6/1995 | Illingworth | ....... | H02M 3/33546 363/21.02 |
| 6,301,128 B1 * | 10/2001 | Jang | ........................ | H02J 5/005 363/17 |
| 8,773,872 B2 * | 7/2014 | Adragna | ................. | H02M 1/08 363/21.02 |
| 9,685,876 B2 * | 6/2017 | Liu | ........................ | H02M 3/337 |
| 10,079,537 B2 * | 9/2018 | Kuang | ................ | H02M 1/4225 |
| 10,170,974 B1 * | 1/2019 | Oh | .......................... | H02M 1/08 |
| 10,425,012 B2 * | 9/2019 | Bianco | .............. | H02M 3/33561 |
| 10,548,202 B2 * | 1/2020 | DeJonge | ................ | H05B 45/37 |
| 2008/0067959 A1 * | 3/2008 | Black | .................. | H05B 47/175 315/324 |

(Continued)

*Primary Examiner* — Adolf D Berhane
(74) *Attorney, Agent, or Firm* — Perkins Coie LLP (57) ABSTRACT

A control method used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor. The method includes: generating an output feedback signal based on a signal of the resonant converter; sensing the voltage across the resonant capacitor generating a signal; comparing the output feedback signal with the voltage sensing signal to generate a high side off signal; determining when to turn off the high side transistor and turn on the low side transistor; detecting an on-time of the high side transistor; and determining when to turn off the low side transistor and turn on the high side transistor.

17 Claims, 7 Drawing Sheets

(56) References Cited

U.S. PATENT DOCUMENTS

| | | | |
|---|---|---|---|
| 2008/0136261 A1* | 6/2008 | Mierta | H05B 47/185 |
| | | | 307/40 |
| 2017/0093296 A1* | 3/2017 | Chen | H02M 1/088 |
| 2017/0110973 A1* | 4/2017 | Chen | H02M 3/33546 |
| 2018/0183325 A1* | 6/2018 | Kuang | H02M 1/4241 |
| 2018/0183343 A1* | 6/2018 | Ausseresse | H02M 3/33576 |
| 2018/0191252 A1* | 7/2018 | Bianco | H02M 3/33569 |
| 2019/0326812 A1* | 10/2019 | Li | H02M 1/4233 |

* cited by examiner

FIG. 1

(PRIOR ART)

CONTROLLER AND CONTROL METHOD USED IN RESONANT CONVERTERS

CROSS-REFERENCE TO RELATED APPLICATIONS

This application claims the benefit of CN application 201810710915.X, filed on Jul. 2, 2018, and incorporated herein by reference.

TECHNICAL FIELD

The present invention generally relates to electronic circuits, and more particularly but not exclusively, to resonant converters.

BACKGROUND

Figure 1:
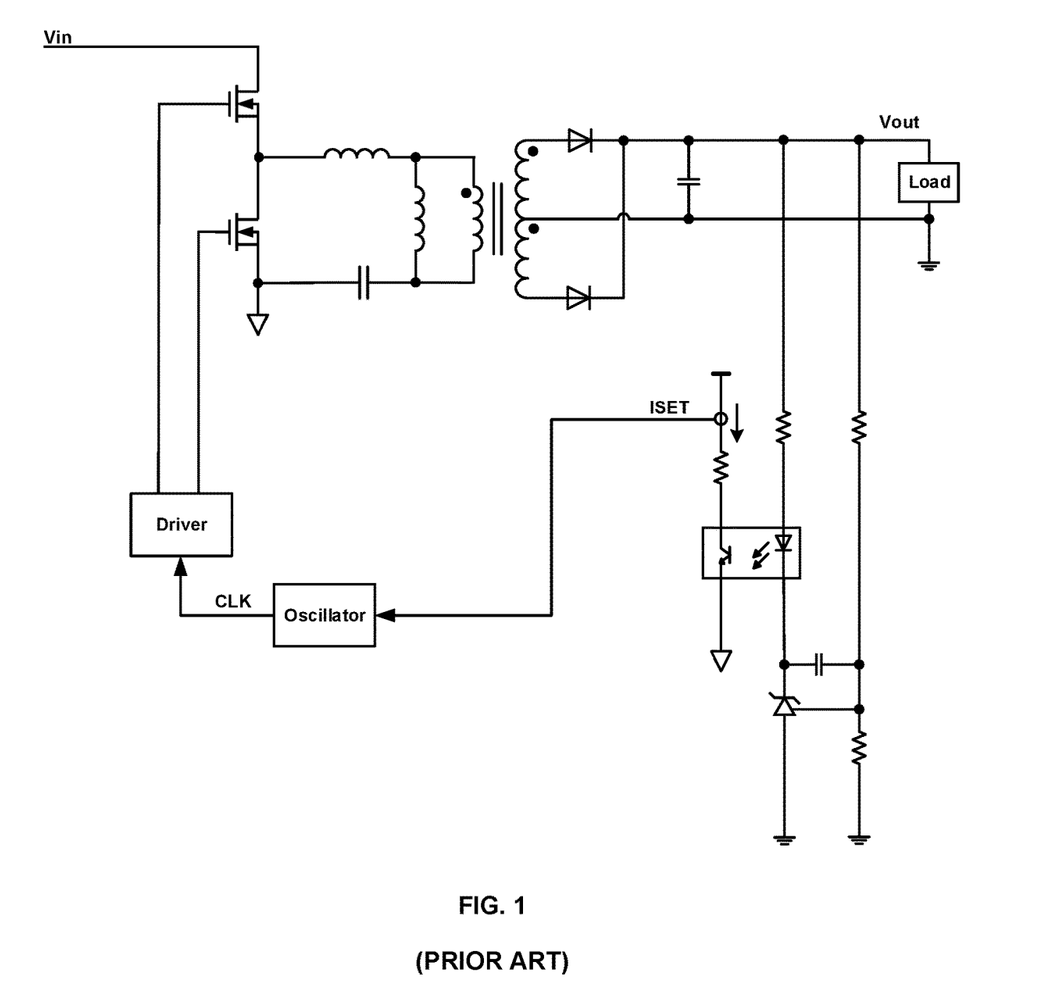
FIG. 1 shows a conventional resonant converter with pulse frequency modulation.

In resonant converters, a switching circuit converts a DC voltage into a square wave voltage and provides it to a resonant circuit. As shown in FIG. 1, a pulse frequency modulation (PFM) method is generally adopted, which generates a clock signal CLK with a duty cycle of 50% through an oscillator to control the switching circuit, and adjusts the frequency of the clock signal CLK based on a feedback signal ISET. A change in the frequency of the clock signal CLK will alter the frequency of the aforementioned square wave voltage, thereby causing a change in the gain of the resonant circuit and ultimately achieving adjustment of the output of the resonant converter.

However, the existing pulse frequency modulation method has a narrow bandwidth and cannot provide a timely and effective response during load transient, which results in a large overshoot or undershoot on the output.

SUMMARY

Embodiments of the present invention are directed to a controller used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor. The controller comprises: a comparing circuit configured to compare an output feedback signal indicative of an output signal of the resonant converter with a voltage sensing signal indicative of a voltage across the resonant capacitor, and generate a high side off signal; and a control circuit coupled to the comparing circuit, and configured to generate a high side control signal and a low side control signal in accordance with the high side off signal to respectively control the high side transistor and low side transistor, wherein the control circuit determines when to turn off the high side transistor in accordance with the high side off signal, and wherein the control circuit detects an on-time of the high side transistor, and turns off the low side transistor when the on-time of the low side transistor becomes equal to the detected on-time of the high side transistor.

Embodiments of the present invention are also directed to a resonant converter, comprising: a switching circuit having a high side transistor and a low side transistor, wherein the high side transistor is coupled between an input voltage and a switch node, and the low side transistor is coupled between the switch node and a reference ground; a resonant circuit coupled to the switch node, wherein the resonant circuit has a resonant capacitor and a resonant inductor; a voltage sensing circuit configured to sense a voltage across the resonant capacitor and generate a voltage sensing signal; an output feedback circuit configured to generate an output feedback signal based on an output signal of the resonant converter; a comparing circuit coupled to the voltage sensing circuit and output feedback circuit, wherein the comparing circuit compares the voltage sensing signal with the output feedback signal, and generates a high side off signal; and a control circuit coupled to the comparing circuit, and configured to generate a high side control signal and a low side control signal in accordance with the high side off signal to respectively control the high side transistor and low side transistor, wherein the control circuit determines when to turn off the high side transistor in accordance with the high side off signal, and wherein the control circuit detects an on-time of the high side transistor, and turns off the low side transistor when the on-time of the low side transistor becomes equal to the detected on-time of the high side transistor.

Embodiments of the present invention are further directed to a control method used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor. The control method includes: generating an output feedback signal based on an output signal of the resonant converter; sensing the voltage across the resonant capacitor to generate a voltage sensing signal; comparing the output feedback signal with the voltage sensing signal to generate a high side off signal; determining when to turn off the high side transistor and when to turn on the low side transistor in accordance with the high side off signal; detecting an on-time of the high side transistor; and determining when to turn off the low side transistor and when to turn on the high side transistor based on the detected on-time of the high side transistor.

Compared with the prior art shown in FIG. 1, the control method in accordance with embodiments of the present invention has a higher bandwidth and thus a quicker response during load transient.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention adopt a novel control method, which compares a voltage sensing signal representing the voltage across the resonant capacitor with an output feedback signal indicative of the output signal of the resonant converter, so as to determine when to turn off the high side transistor. Afterwards, the on-time of the high side transistor is detected, and the on-time of the low side transistor is regulated to be equal to the detected on-time of the high side transistor. Compared with the prior art shown in FIG. 1, the control method in accordance with embodiments of the present invention has a higher bandwidth and better dynamic performance.

Figure 2:
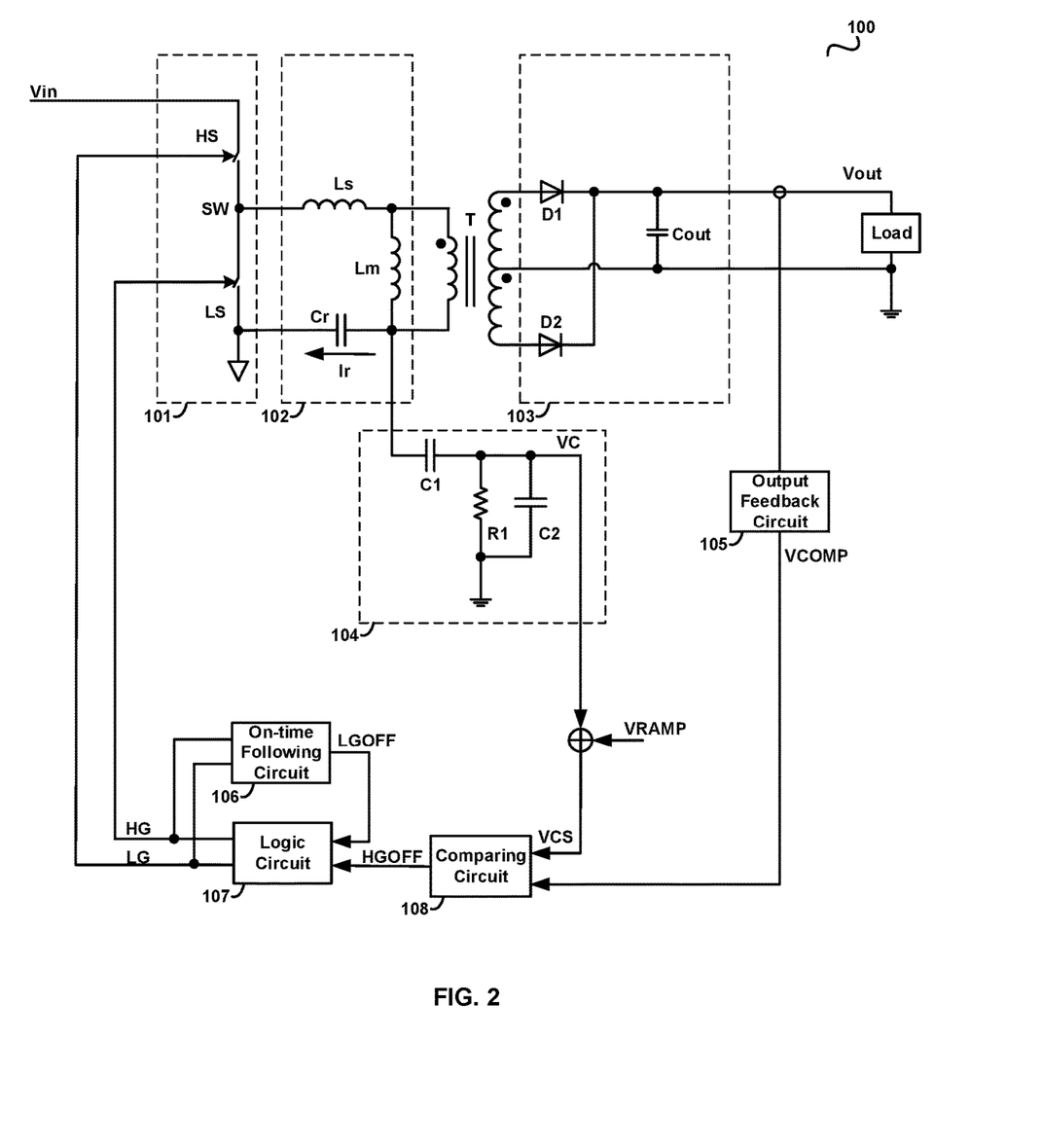
FIG. 2 is a block diagram of a resonant converter 100 in accordance with an embodiment of the present invention.

FIG. 2 is a block diagram of a resonant converter 100 in accordance with an embodiment of the present invention. It comprises a switching circuit 101, a resonant circuit 102, a transformer T, a rectifying and filtering circuit 103, a voltage sensing circuit 104, an output feedback circuit 105, and an on-time following circuit 106, a logic circuit 107 and a comparing circuit 108. The switching circuit 101 includes a high side transistor HS coupled between an input voltage Vin and a switch node SW, and a low side transistor LS coupled between the switch node SW and a reference ground. The resonant circuit 102 is coupled to the switch node SW, and includes an LLC circuit consisting of a capacitor Cr and inductors Ls, Lm. The inductor Lm is generally formed by a magnetizing inductance of the transformer T. However, a discrete inductor may also be used.

The primary winding of the transformer T is coupled to the resonant circuit 102. The rectifying and filtering circuit 103, which includes diodes D1, D2 and a capacitor Cout, rectifies and filters the voltage across the secondary winding of the transformer T, so as to provide an output voltage Vout to a load. Although the rectifying and filtering circuit 103 employs a full-wave rectifying circuit consisting of diodes D1 and D2 and a filter circuit consisting of the capacitor Cout in the embodiment shown in FIG. 2, those skilled in the art can understand that, rectifying circuits and filter circuits with other structures (e.g. half-wave rectification, full-bridge rectification) are also applicable here.

The voltage sensing circuit 104 senses a voltage across the resonant capacitor Cr to generate a voltage sensing signal VC. The voltage sensing circuit 104 of FIG. 2 includes capacitors C1, C2 and a resistor R1. The capacitor C1 has a first terminal and a second terminal, wherein the first terminal is coupled to the resonant capacitor Cr, and the second terminal is configured to provide the voltage sensing signal VC. The resistor R1 and capacitor C2 are coupled in parallel between the second terminal of capacitor C1 and the reference ground. In the embodiment shown in FIG. 2, the capacitor C1 works as a DC blocking capacitor, which isolates DC signal and allows only AC signal to pass. Therefore, the voltage sensing signal VC no longer includes DC component, but substantially has an AC quasi-sinusoidal waveform.

The output feedback circuit 105 is configured to generate an output feedback signal VCOMP based on the output voltage Vout. In some embodiments, the output feedback circuit 105 includes a voltage divider coupled to the output voltage Vout, and an error amplifying circuit which proportionally integrates the error between the signal generated by the voltage divider and a reference voltage. In some other embodiments, the output feedback circuit 105 utilizes a conventional three-terminal regulator and an impedance network to obtain the output feedback signal VCOMP. In applications where the primary and secondary windings of the transformer are electrically isolated from each other, the output feedback circuit 105 may further include isolation devices, such as photo couplers.

The comparing circuit 108 is coupled to the voltage sensing circuit 104 and the output feedback circuit 105, and compares the voltage sensing signal VC with the output feedback signal VCOMP to generate a high side off signal HGOFF. In some embodiments, to ensure stable operation of the converter, a slope compensation signal VRAMP is added to the voltage sensing signal VC. A sum (VCS) of the voltage sensing signal VC and the slope compensation signal VRAMP is compared with the output feedback signal VCOMP to generate the high side off signal HGOFF.

In accordance with the high side off signal HGOFF, a high side control signal HG and a low side control signal LG for respectively controlling the high side transistor HS and the low side transistor LS could be generated by a control circuit. Ideally, the transistors HS and LS switch on and off alternatively and complementarily. The high side off signal HGOFF determines when the high side transistor HS is turned off and when the low side transistor LS is turned on. The on-time of the high side transistor HS is detected. The low side transistor LS is turned off and the high side transistor HS is turned on when the on-time of the low side transistor LS becomes equal to the detected on-time of the high side transistor HS.

In the embodiment shown in FIG. 2, the aforementioned control circuit is mainly realized by an on-time following circuit 106 and a logic circuit 107. The on-time following circuit 106 receives the high side control signal HG and the low side control signal LG, and detects the on-time of the high side transistor HS based on the high side control signal HG. In accordance with the low side control signal LS and the detected on-time of high side transistor HS, the on-time following circuit 106 generates a low side off signal LGOFF. The logic circuit 107 is coupled to the comparing circuit 108 and the on-time following circuit 106, and generates the high side control signal HG and low side control signal LG in accordance with the high side off signal HGOFF and the low side off signal LGOFF.

Figure 3:
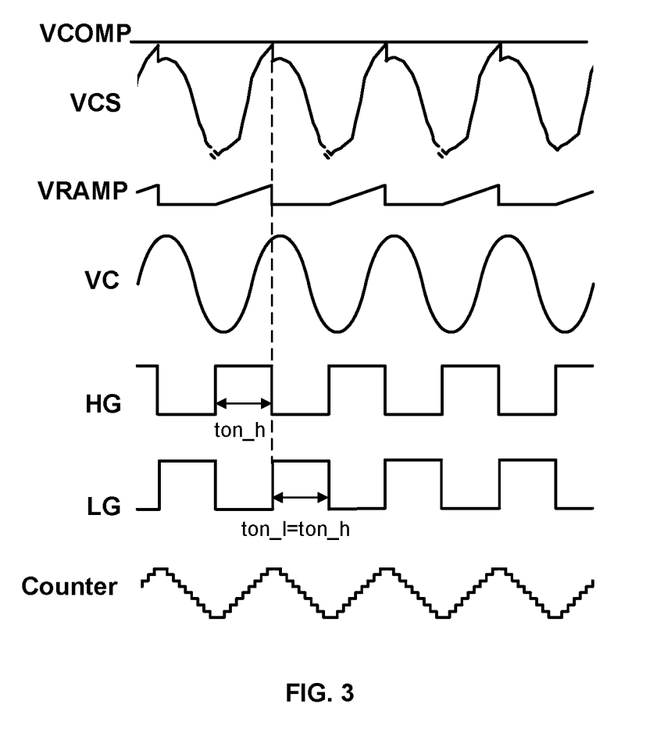
FIG. 3 illustrates working waveforms of the resonant converter 100 in accordance with an embodiment of the present invention.

FIG. 3 illustrates working waveforms of the resonant converter 100 in accordance with an embodiment of the present invention, wherein ton_h represents the on-time of the high side transistor HS, and ton_l represents the on-time of the low side transistor LS. As shown in FIG. 3, when the sum (VCS) of the voltage sensing signal VC and the slope compensation signal VRAMP increases to be larger than the output feedback signal VCOMP, the high side transistor HS is turned off and the low side transistor LS is turned on.

When the on-time ton_l of the low side transistor LS becomes equal to the on-time ton_h of the high side transistor HS, the high side transistor HS is turned on and the low side transistor LS is turned off. Detection of the on-time ton_h and ton_l could be realized by simple counters or timers, and is detailed described here for clarity.

In practical applications, in order to effectively avoid shoot through and facilitate soft switching of the high side and low side transistors, a time interval is incorporated between switching off of one of the high side and low side transistors and switching on of the other. This time interval is generally known as "dead time", which could either be constant or adaptively adjusted in accordance with circuit operation. In FIG. 3, the dead time is not shown for brevity.

When the resonant converter is just powered on or restarted, since the voltage across the resonant capacitor Cr is not balanced, the resonant current Ir flowing through the resonant circuit may not be able to complete its commutation before the low side transistor HS being turned off. That is, there in not enough time for the resonant current Ir to change from a positive direction (flowing from the switching circuit 102 into the resonant circuit 102 through the switch node SW) into a negative direction (flowing from the resonant circuit 102 into the switching circuit 101 through the switch node SW), which results in hard switching. To solve this problem, the resonant converter 200 shown in FIG. 4 further introduces a current direction detecting circuit 109. The current direction detecting circuit 109 detects the direction of the resonant current Ir, and provides a current direction detecting signal CDD to the logic circuit 107. When the low side transistor LS is on, the logic circuit 107 can turn off the low side transistor LS only after the direction of the resonant current Ir is detected to become negative. In this circumstance, the on-time of the low side transistor LS may become longer than the on-time of the high side transistor HS.

Figure 4:
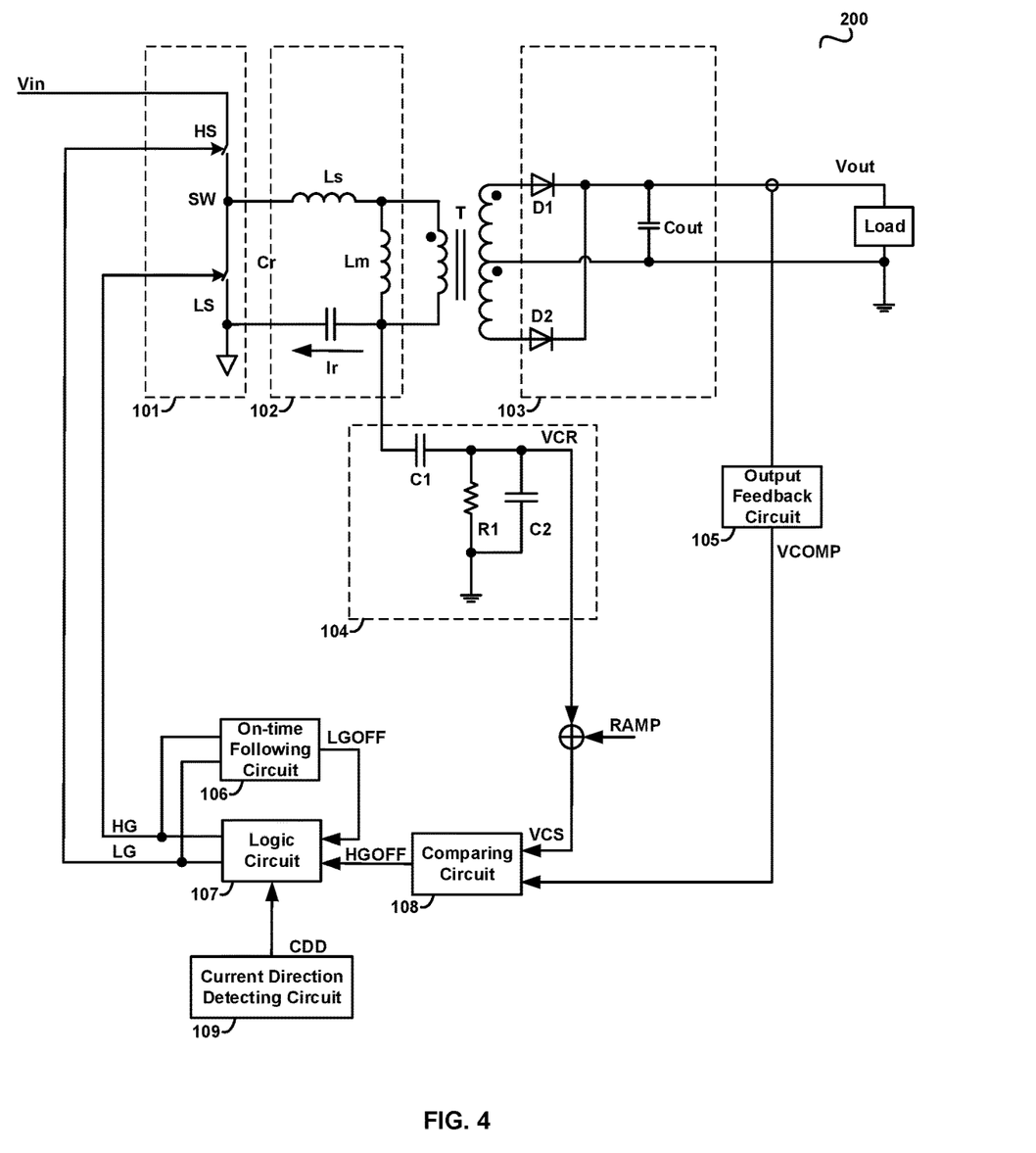
FIG. 4 is a block diagram of a resonant converter 200 in accordance with an embodiment of the present invention.

In some embodiments, to prevent the resonant converter from entering a capacitive mode (the voltage at the switch node SW lags the resonant current Ir), the logic circuit 107 may turn off the low side transistor LS in advance when the resonant current Ir is detected to be about to change from the negative direction into the positive direction, and turn off the high side transistor HS in advance when the resonant current Ir is detected to be about to change from the positive direction into the negative direction, even if the aforementioned turning off conditions have not been met yet.

Figure 5:
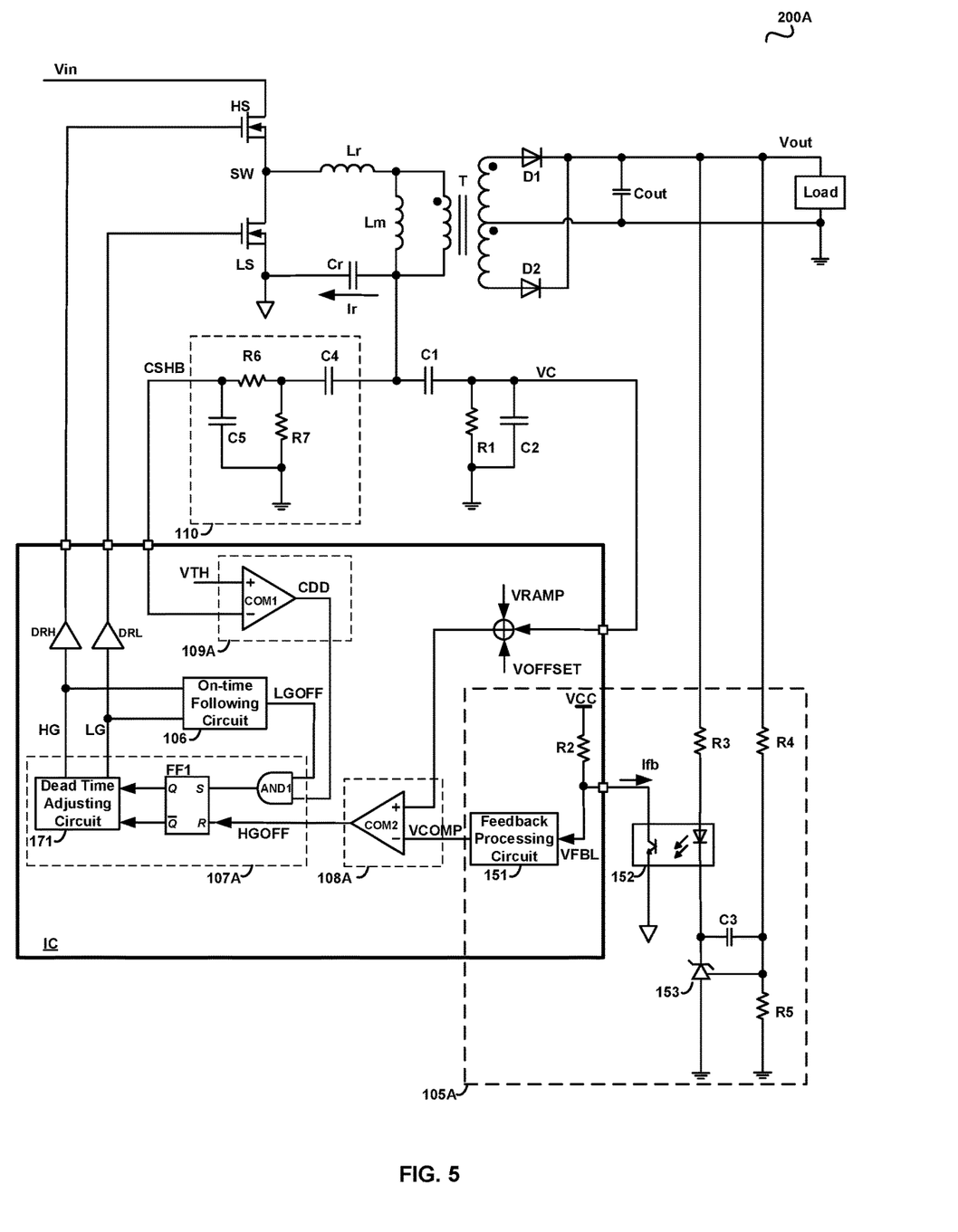
FIG. 5 schematically illustrates a resonant converter 200A in accordance with an embodiment of the present invention.

FIG. 5 schematically illustrates a resonant converter 200A in accordance with an embodiment of the present invention, wherein a current sensing circuit 110 is used to sense the resonant current Ir and generate a current sensing signal CSHB. The current sensing circuit 110 could be realized by sensing resistors, current transformers, or other suitable structures. In the embodiment shown in FIG. 5, it includes capacitors C4, C5 and resistors R6, R7, connected as shown in the figure. The capacitance of capacitor C4 is normally small, which might be:

$$C4 \leq \frac{Cr}{100}$$

The current direction detecting circuit 109A includes a comparator COM1 coupled to the current sensing circuit 110. The comparator COM1 compares the current sensing signal CSHB with a threshold voltage VTH (for example, −80 mV), to determine the direction of the resonant current Ir and generate the current direction detecting signal CDD.

The output feedback circuit 105A includes a feedback processing circuit 151, a photo coupler 152, a three-terminal regulator 153, resistors R2~R5, and a capacitor C3. A current Ifb flowing through the photosensitive element in the photo coupler 152 is generated based on the output voltage Vout, and then converted into a voltage signal VFBL through the resistor R2. The feedback processing circuit 501 processes the voltage signal VFBL to generate the output feedback signal VCOMP. In some embodiments, the output feedback signal VCOMP can be expressed as:

$$VCOMP=AX*VFBL+BX=AX*(VCC-Ifb*R2)+BX$$

AX is a proportional coefficient of the feedback processing circuit 501, and BX is an offset value. AX and BX could have different values in different working modes. When AX is 1 and BX is 0, the output feedback signal VCOMP is directly equal to VFBL.

The comparing circuit 108A includes a comparator COM2, wherein the non-inverting input terminal of the comparator COM2 receives the sum of the voltage sensing signal VC and the slope compensation signal VRAMP, and the inverting input terminal is coupled to the feedback processing circuit 151 to receive the output feedback signal VCOMP. In some embodiments, to counteract the effect caused by saturation voltage of the photosensitive element, a bias voltage VOFFSET (e.g., 200 mV) is further added to the non-inverting input terminal of the comparator COM2.

The logic circuit 107A includes a dead time adjusting circuit 171, a flip flop FF1, and an AND gate AND1. The two input terminals of the AND gate AND1 are respectively configured to receive the low side off LGOFF and the current direction detecting signal CDD. The flip-flop FF1 has a set terminal S, a reset terminal R, and output terminals Q and /Q, wherein the set terminal S is coupled to the output terminal of the AND gate AND1, and the reset terminal R is coupled to the output terminal of the comparator COM2. The dead time adjusting circuit 701 is coupled to the output terminals Q and/Q of the flip flop FF1, and generates the high side control signal HG and low side control signal LG in accordance with the output signals of the flip flop FF1. In the embodiment shown in FIG. 5, the high side transistor HS and the low side transistor LS are both NMOS, and the high side control signal HG and low side control signal LG are respectively coupled to gate terminals of the transistor HS and LS through driving circuits DRH and DRL.

Figure 6:
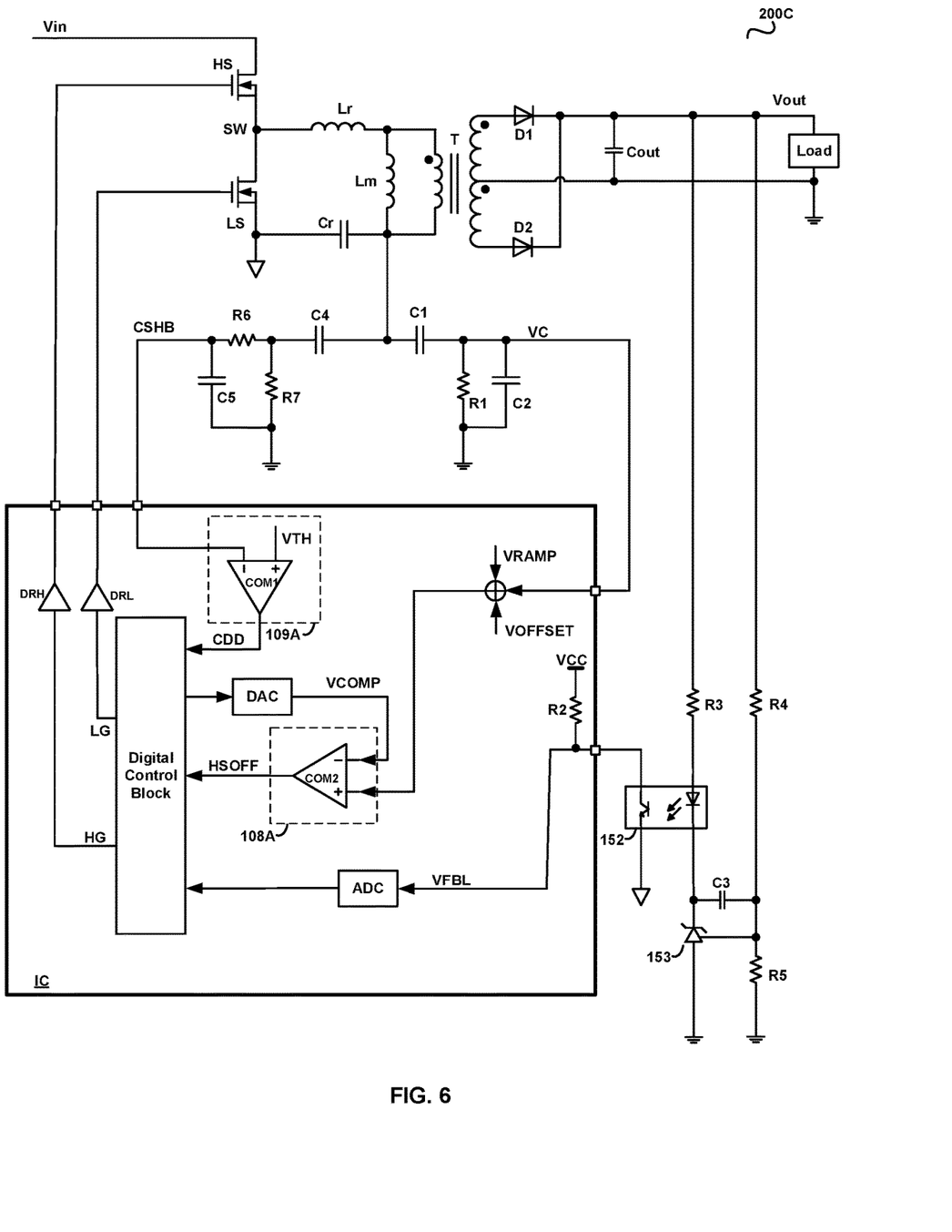
FIG. 6 schematically illustrates a resonant converter 200B in accordance with an embodiment of the present invention.

In the embodiment shown in FIG. 5, a part of the output feedback circuit 105A is integrated in the same controller IC with the on-time following circuit 106, logic circuit 107A, comparing circuit 108A, and current direction detecting circuit 109A. However, it is apparent to those skilled in the art that this is not intended to limit the present invention. The aforementioned circuits may be partially or collectively integrated in other ways, without departing from the scope of the present invention. For instance, in an embodiment shown in FIG. 6, the feedback processing circuit 151, on-time following circuit 106, and logic circuit 107A of FIG. 5 are all realized by a digital control block. A digital-to-analog converter (DAC) and an analog-to-digital converter (ADC) are utilized for conversion between digital and analog signals.

Although the switching circuit is configured in half bridge circuit in all embodiments described above, persons of ordinary skill in the art could recognize that, the switching circuit can also be configured in a full bridge circuit with four transistors. Furthermore, transistors in the switching circuit could be other controllable semiconductor transistors besides MOSFET. Similarly, although an LLC circuit is used as an example of the resonant circuit in the foregoing embodiments, other resonant circuits, such as LCC circuit, are also applicable to the present invention.

In addition, it should be noted that, for resonant converters of the present invention, the transformer and the rectifying and filtering circuit are not necessary, and therefore could be partially or all omitted as needed. Also, depending on practical requirements, the output signal fed back by the output feedback circuit may be the output current or output power of the resonant converter, rather than the output voltage.

Figure 7:
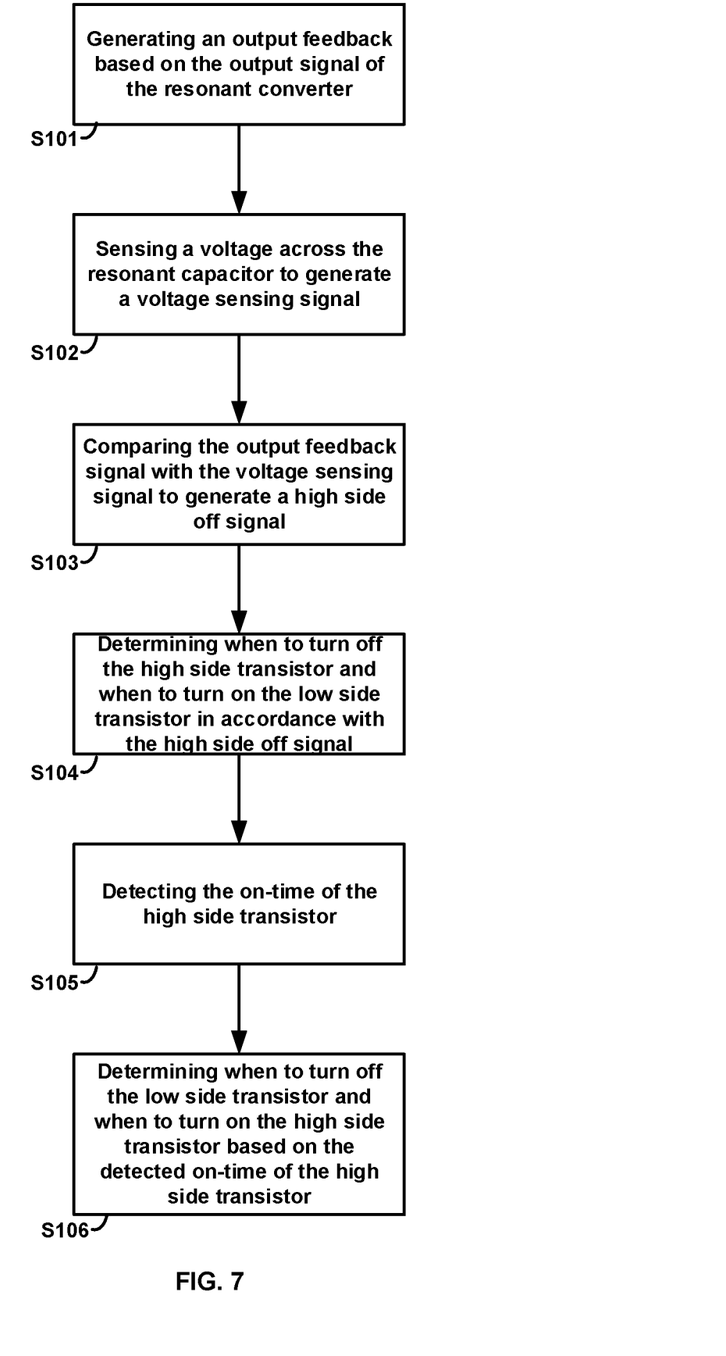
FIG. 7 is a flow chart of a control method used in a resonant converter in accordance with an embodiment of the present invention.

FIG. 7 is a flow chart of a control method used in a resonant converter in accordance with an embodiment of the present invention. It includes steps S101-S106. The resonant converter includes a switching circuit and a resonant circuit, wherein the switching circuit has a high side transistor coupled between an input voltage and a switch node and a low side transistor coupled between the switch node and a reference ground. The resonant circuit is coupled to the switch node, and has a resonant capacitor and the resonant inductor.

At step S101, an output feedback signal is generated based on an output signal of the resonant converter.

At step S102, a voltage across the resonant capacitor is sensed to generate a voltage sensing signal.

At step S103, the output feedback signal is compared with the voltage sensing signal to generate a high side off signal.

At step S104, in accordance with the high side off signal, when the high side transistor is turned off and when the low side transistor is turned on is determined.

At step S105, the on-time of the high side transistor is detected.

At step S106, based on the detected on-time of the high side transistor, it is determined when the low side transistor is turned off and when the high side transistor is turned on.

In some embodiments, the control method further includes detecting a direction of a resonant current flowing through the resonant circuit. When the low side transistor is on, the low side transistor can be turned off only after the direction of the resonant current becomes negative (flowing from the resonant circuit into the switching circuit through the switch node), so as to avoid hard switching.

In some embodiments, a slope compensation signal is added to the voltage sensing signal. A sum of the slope compensation signal and the voltage sensing signal is compared with the output feedback signal to generate the high side off signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor, the controller comprises:
   a comparing circuit configured to compare an output feedback signal indicative of an output signal of the resonant converter with a voltage sensing signal indicative of a voltage across the resonant capacitor, and to generate a high side off signal; and
   a control circuit coupled to the comparing circuit, and configured to generate a high side control signal and a low side control signal in accordance with the high side off signal to respectively control the high side transistor and the low side transistor, wherein the control circuit determines when to turn off the high side transistor in accordance with the high side off signal, and wherein the control circuit detects an on-time of the high side transistor, and turns off the low side transistor when the on-time of the low side transistor becomes equal to the detected on-time of the high side transistor.

2. The controller of claim 1, wherein the control circuit comprises:
   an on-time following circuit coupled to the high side control signal and low side control signal, wherein the on-time following circuit detects the on-time of the high side transistor based on the high side control signal, and generates a low side off signal in accordance with the low side control signal and the detected on-time of the high side transistor; and
   a logic circuit coupled to the comparing circuit and the on-time following circuit, wherein in accordance with the high side off signal and the low side off signal, the logic circuit generates the high side control signal and low side control signal to respectively control the high side transistor and low side transistor.

3. The controller of claim 2, wherein the logic circuit comprises:
   a flip-flop having a first input terminal, a second input terminal, a first output terminal and a second output terminal, wherein the first input terminal is coupled to the on-time following circuit to receive the low side-side off signal, and the second input terminal is coupled to the comparing circuit to receive the high side off signal; and
   a dead time adjusting circuit having a first input terminal, a second input terminal, a first output terminal, and a second output terminal, wherein the first input terminal is coupled to the first output terminal of the flip-flop, the second input terminal is coupled to the second output terminal of the flip-flop, the first output terminal is configured to provide the high side control signal, and the second output terminal is configured to provide the low side control signal.

4. The controller of claim 1, further comprising:
   a current direction detecting circuit coupled to the control circuit, wherein the current direction detecting circuit detects a direction of a resonant current flowing through the resonant circuit and provides a current direction detecting signal to the control circuit; and wherein
   when the low side transistor is on, the control circuit can turn off the low side transistor only after the direction of the resonant current changes into a direction from the resonant circuit into the switch circuit via the switch node.

5. The controller of claim 1, wherein the voltage sensing signal is an alternating current voltage signal coupled to the resonant capacitor through a first capacitor.

6. The controller of claim 1, wherein a slope compensation signal is added to the voltage sensing signal, and the comparing circuit compares a sum of the slope compensation signal and the voltage sensing signal with the output feedback signal to generate the high side off signal.

7. A resonant converter, comprising:
a switching circuit having a high side transistor and a low side transistor, wherein the high side transistor is coupled between an input voltage and a switch node, and the low side transistor is coupled between the switch node and a reference ground;
a resonant circuit coupled to the switch node, wherein the resonant circuit has a resonant capacitor and a resonant inductor;
a voltage sensing circuit configured to sense a voltage across the resonant capacitor and generate a voltage sensing signal;
an output feedback circuit configured to generate an output feedback signal based on an output signal of the resonant converter;
a comparing circuit coupled to the voltage sensing circuit and output feedback circuit, wherein the comparing circuit compares the voltage sensing signal with the output feedback signal, and generates a high side off signal; and
a control circuit coupled to the comparing circuit, and configured to generate a high side control signal and a low side control signal in accordance with the high side off signal to respectively control the high side transistor and low side transistor, wherein the control circuit determines when to turn off the high side transistor in accordance with the high side off signal, and wherein the control circuit detects an on-time of the high side transistor, and turns off the low side transistor when the on-time of the low side transistor becomes equal to the detected on-time of the high side transistor.

8. The resonant converter of claim 7, wherein the control circuit comprises:
an on-time following circuit coupled to the high side control signal and low side control signal, wherein the on-time following circuit detects the on-time of the high side transistor based on the high side control signal, and generates a low side off signal in accordance with the low side control signal and the detected on-time of the high side transistor; and
a logic circuit coupled to the comparing circuit and the on-time following circuit, wherein in accordance with the high side off signal and the low side off signal, the logic circuit generates the high side control signal and low side control signal to respectively control the high side transistor and low side transistor.

9. The resonant converter of claim 8, wherein the logic circuit comprises:
a flip-flop having a first input terminal, a second input terminal, a first output terminal and a second output terminal, wherein the first input terminal is coupled to the on-time following circuit to receive the low side-side off signal, and the second input terminal is coupled to the comparing circuit to receive the high side off signal; and
a dead time adjusting circuit having a first input terminal, a second input terminal, a first output terminal, and a second output terminal, wherein the first input terminal is coupled to the first output terminal of the flip-flop, the second input terminal is coupled to the second output terminal of the flip-flop, the first output terminal is configured to provide the high side control signal, and the second output terminal is configured to provide the low side control signal.

10. The resonant converter of claim 7, further comprising:
a current direction detecting circuit coupled to the control circuit, wherein the current direction detecting circuit detects a direction of a resonant current flowing through the resonant circuit and provides a current direction detecting signal to the control circuit; and wherein
when the low side transistor is on, the control circuit can turn off the low side transistor only after the direction of the resonant current changes into a direction from the resonant circuit into the switch circuit via the switch node.

11. The resonant converter of claim 7, wherein the voltage sensing signal is an alternating current voltage signal coupled to the resonant capacitor through a first capacitor.

12. The resonant converter of claim 7, wherein a slope compensation signal is added to the voltage sensing signal, and the comparing circuit compares a sum of the slope compensation signal and the voltage sensing signal with the output feedback signal to generate the high side off signal.

13. The resonant converter of claim 7, wherein the voltage sensing circuit comprises:
a first capacitor having a first terminal and a second terminal, wherein the first terminal is coupled to the resonant capacitor, and the second terminal is configured to provide the voltage sensing signal;
a first resistor coupled between the second terminal of the first capacitor and the reference ground; and
a second capacitor coupled between the second terminal of the first capacitor and the reference ground.

14. The resonant converter of claim 7, further comprising:
a transformer having a primary winding and a secondary winding, wherein the primary winding is coupled to the resonant circuit; and
a rectifying and filtering circuit coupled between the secondary winding of the transformer and a load, wherein the rectifying and filtering circuit rectifies and filters the voltage across the secondary winding of the transformer, to provide the output signal of the resonant converter to the load.

15. A control method used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor, the control method comprises:
generating an output feedback signal based on an output signal of the resonant converter;
sensing the voltage across the resonant capacitor to generate a voltage sensing signal;
comparing the output feedback signal with the voltage sensing signal to generate a high side off signal;
determining when to turn off the high side transistor and when to turn on the low side transistor in accordance with the high side off signal;
detecting an on-time of the high side transistor; and
determining when to turn off the low side transistor and when to turn on the high side transistor based on the detected on-time of the high side transistor.

16. The control method of claim 15, further comprising:
detecting a direction of a resonant current flowing through the resonant circuit; and wherein
when the low side transistor is on, the low side transistor can be turned off only after the direction of the resonant current changes into a direction from the resonant circuit into the switch circuit via the switch node.

17. The control method of claim 15, further comprising:
adding a slope compensation signal to the voltage sensing signal; and wherein
a sum of the slope compensation signal and the voltage sensing signal is compared with the output feedback signal to generate the high side off signal.

\* \* \* \* \*